United States Patent
Bai et al.

(10) Patent No.: US 11,421,140 B2
(45) Date of Patent: Aug. 23, 2022

(54) HIGH-TEMPERATURE RESISTANT, HIGH-STRENGTH, AND THIXOTROPIC GEL PLUGGING AGENT AND ITS PREPARATION METHOD AND APPLICATION

(71) Applicant: CHINA UNIVERSITY OF PETROLEUM (EAST CHINA), Qingdao (CN)

(72) Inventors: Yingrui Bai, Qingdao (CN); Jinsheng Sun, Qingdao (CN); Kaihe Lv, Qingdao (CN); Ren Wang, Qingdao (CN); Jingping Liu, Qingdao (CN); Xianbin Huang, Qingdao (CN); Jintang Wang, Qingdao (CN); Jiafeng Jin, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 17/111,291

(22) Filed: Dec. 3, 2020

(65) Prior Publication Data

US 2021/0087453 A1    Mar. 25, 2021

(51) Int. Cl.
| | | |
|---|---|---|
| *C09K 8/512* | (2006.01) | |
| *C09K 8/035* | (2006.01) | |
| *C09K 8/516* | (2006.01) | |
| *E21B 21/00* | (2006.01) | |
| *E21B 33/138* | (2006.01) | |
| *C08F 2/32* | (2006.01) | |
| *C08L 33/26* | (2006.01) | |

(52) U.S. Cl.
CPC ............ *C09K 8/035* (2013.01); *C08F 2/32* (2013.01); *C08L 33/26* (2013.01); *C09K 8/512* (2013.01); *C09K 8/516* (2013.01); *E21B 21/003* (2013.01); *E21B 33/138* (2013.01)

(58) Field of Classification Search
CPC ........ C09K 8/035; C09K 8/512; C09K 8/516; C09K 8/426; C09K 8/424; C09K 8/44; C08F 2/32; C08L 33/26; E21B 21/003; E21B 33/138
See application file for complete search history.

(56) References Cited

FOREIGN PATENT DOCUMENTS

| CN | 102516431 A | * | 6/2012 |
| CN | 109796949 A | * | 5/2019 |
| CN | 109825269 A | * | 5/2019 |

* cited by examiner

*Primary Examiner* — Kumar R Bhushan
(74) *Attorney, Agent, or Firm* — CBM Patent Consulting, LLC

(57) ABSTRACT

A high-temperature resistant, high-strength, and thixotropic gel plugging agent is composed of 8-20% of acrylamide monomer, 0.05-0.5% of reactive polymer, 0.1-1.0% of organic polymer cross-linker, 3.0-8.0% of resin toughening agent, 1.0-5.0% of flow pattern regulator, 0.01-0.5% of cross-linking regulator by the weight in the water. The gel solution shows a low apparent viscosity during the shear flow and is easy to be pumped into the wellbore and then into the formation leakage layer; after the pumping stops, the gel solution shows rapidly increased viscosity and strong adhesive force, and form a high-strength barrier between the wellbore and the formation, preventing the drilling fluid from further leaking.

12 Claims, 2 Drawing Sheets

HIGH-TEMPERATURE RESISTANT, HIGH-STRENGTH, AND THIXOTROPIC GEL PLUGGING AGENT AND ITS PREPARATION METHOD AND APPLICATION

This application claims priority to Chinese Patent Application Ser. No. CN202010771976.4 filed on 4 Aug. 2020.

TECHNICAL FIELD

The invention is related to a high-temperature resistant, high-strength, and thixotropic gel plugging agent and its preparation method and application, and belongs to the technical field of drilling fluid leakage plugging.

BACKGROUND ART

Lost circulation is a phenomenon where a large amount of drilling fluid leaks into the formation drilled during the drilling operations, and it is also the most common drilling engineering roadblock in complex fractured formations. It not only wastes drilling time and bulk of drilling fluid, but also may lead to borehole collapse, blowout, jamming of the drilling tool, and other complex underground accidents in the event of improper handling, and may even lead to borehole abandonment, resulting in heavy economic losses. Therefore, it is crucially important to effectively solve the lost circulation problem to ensure underground safety, improve drilling speed, and save drilling costs.

As one of the commonly used and effective plugging agents, the polymer gel plugging agent injected into the leakage zone in a certain amount can plug the fracture after solidification and act as a barrier between the drilling fluid and the formation fluid. It is worth mentioning that the performance of the gel plugging agent is the key to the success of plugging. At present, the gel plugging agents in use have achieved good results in field applications. However, along with the oil and gas exploration and development moving toward deeper formations, high temperature and high pressure have become one of the main challenges in the leaking stoppage, which has put forward higher requirements for the high-temperature and pressure-resistance plugging performance of the gel plugging agents. What's more, as for a fracture-developed formation, due to the influence of gravity sedimentation and other factors, conventional plugging agent solutions cannot fill up the vertical fracture space effectively, resulting in poor plugging effect in the middle-upper part of the fracture.

To solve the above problems, the inventor's team provides a shear-sensitive gel plugging agent and a high-temperature resistant gel plugging agent via Chinese Patent Documents CN109825269A and CN109796949A respectively. The shear-sensitive gel plugging agent is mainly composed of polymer composite monomer, solid-phase organic macromolecule cross-linker, initiator, rheological regulator, and toughening agent, and the gel solution has the shear-sensitive property of "shearing dilution and thickening while standing". The high-temperature resistant gel plugging agent is mainly composed of vinyl polymeric monomer, solid-phase organic macromolecule cross-linker, initiator, particle toughening agent, and fiber toughening agent. These two gels mainly rely on the polymerization reactions between the vinyl monomer and the vinyl groups on the solid-phase organic macromolecule cross-linker to form a skeleton structure dominated by polymers. Compared with conventional gels, these two gels have better temperature resistance performance, but are still insufficient to meet the high-strength long-term plugging requirements in the formations with high temperature over 120° C.

Therefore, it is necessary to develop a gel plugging agent with high temperature resistance, high strength, and high thixotropic properties to solve the lost circulation problem in high-temperature deep fractured leakage formations.

DESCRIPTION OF THE INVENTION

To address the shortcomings of the existing technologies, the invention presents a high-temperature resistant, high-strength, and thixotropic gel plugging agent and its preparation method and application. The gel solution in the invention shows a low apparent viscosity during the shear flow and is easy to be pumped into the wellbore and then into the leakage layers of the formation; after the pumping stops, the gel solution shows rapidly increased viscosity and strong adhesive force, so it can stay in the leakage layers easily; then, the gel solution gelates after cross-linking and solidifying and forms a high-temperature resistant and high-strength barrier in the leakage layers between the wellbore and the formation, preventing the drilling fluid from further leaking.

The technical solution of the invention is as follows:

A high-temperature resistant, high-strength, and thixotropic gel plugging agent, which is composed of raw materials in the following mass percent: 8-20% acrylamide monomer, 0.05-0.5% reactive polymer, 0.1-1.0% organic polymer cross-linker, 3.0-8.0% resin toughening agent, 1.0-5.0% flow pattern regulator, 0.01-0.5% cross-linking regulator, and water in the remaining percentage.

According to a preferred embodiment of the invention, the said high-temperature resistant, high-strength, and thixotropic gel plugging agent is composed of raw materials in the following mass percent: 12-18% acrylamide monomer, 0.1-0.3% reactive polymer, 0.3-0.8% organic polymer cross-linker, 4.0-7.0% resin toughening agent, 2.0-4.0% flow pattern regulator, 0.05-0.2% cross-linking regulator, and water in the remaining percentage.

According to a preferred embodiment of the invention, the said reactive polymer is a polycondensatable macromolecular polymer with hydroxymethyl groups ($-CH_2OH$) on its surface, and the said reactive polymer has a viscosity-average molecular weight of 5-13 million.

According to a preferred embodiment of the invention, the said reactive polymer shall be prepared with the following method:

(1) Add lipophilic emulsifier and hydrophilic emulsifier into the oil-phase solvent and stir them evenly; then, add hydrophobic monomer drop by drop slowly into the above solution system and stir them evenly to get the solution A;

(2) Add acrylamide monomer and functional cross-linker into the deoxygenated and deionized water, and stir until they dissolve completely; then, add EDTA (ethylenediamine tetraacetic acid) and stir until it dissolves completely to get the solution B;

(3) Add the solution A slowly into the solution B drop by drop and stir evenly. After the temperature rises to 40-60° C., add the chain extender and initiator in order and stir to stimulate the reaction and get the microemulsion C;

(4) Add the precipitant into the microemulsion C to separate out solid-phase materials; wash and dry these materials to get the reactive polymer.

According to a preferred embodiment of the invention, the said oil-phase solvent in Step (1) is a combination of one or more from among cyclohexane, kerosene and liquid paraffin.

According to a preferred embodiment of the invention, the said lipophilic emulsifier in Step (1) is a mixture of Span60 (sorbitan stearate) and Span80 (sorbitane monooleate). The mass ratio of Span60 to Span80 in the said mixture is 0.2-0.6:1 and is further preferred to be 0.3-0.5:1; the mass of the said lipophilic emulsifier is 0.5-2.5% of that of the oil-phase solvent and is further preferred to be 0.8-1.8%.

According to a preferred embodiment of the invention, the said hydrophilic emulsifier in Step (1) is a mixture of Tween 60 (polyethylene sorbitan monostearate) and Tween80 (polyoxyethylenesorbitan monooleate). The mass ratio of Tween60 to Tween80 in the said mixture is 1-4:1 and is further preferred to be 1.5-2.5:1; the mass of the said hydrophilic emulsifier is 0.25-1.2% of that of the oil-phase solvent and is further preferred to be 0.4-0.9%.

According to a preferred embodiment of the invention, the said hydrophobic monomer in Step (1) is a combination of one or more from among styrene, α-methylstyrene, and 4-methylstyrene; the mass of the said hydrophobic monomer is 5-12% of that of the oil-phase solvent and is further preferred to be 6-10%.

According to a preferred embodiment of the invention, the said acrylamide monomer and the deionized water in Step (2) have a mass ratio of 0.05-0.20:1; the said acrylamide monomer and hydrophobic monomer have a mass ratio of 5-15:1.

According to a preferred embodiment of the invention, the said functional cross-linker in Step (2) is N-methylol acrylamide; the mass of the said functional cross-linker is 5-25% of that of the acrylamide monomer and is further preferred to be 8-17%.

According to a preferred embodiment of the invention, the mass of the said EDTA in Step (2) is 0.03-0.2% of that of the acrylamide monomer and is further preferred to be 0.05-0.1%.

According to a preferred embodiment of the invention, the said chain extender in Step (3) is a combination of one or more from among ethanediamine, triethanolamine, trimethylolpropane, and sorbitol. The mass of the said chain extender is 2-12% of that of the acrylamide monomer and is further preferred to be 3.5-7%.

According to a preferred embodiment of the invention, the said initiator in Step (3) is potassium persulfate and/or ammonium persulfate, and the mass of the said initiator is 0.2-2.5% of that of the acrylamide monomer and is further preferred to be 0.5-1.3%.

According to a preferred embodiment of the invention, the said reaction time in Step (3) is 6-12 h.

According to a preferred embodiment of the invention, the said precipitant in Step (4) is absolute ethyl alcohol. The said precipitant and the microemulsion C have a volume ratio of 0.5-1.0:1; the said washing shall be carried out with absolute ethyl alcohol.

According to a preferred embodiment of the invention, the said organic polymer cross-linker is a polymerizable macromolecular polymer with vinyl groups ($CH_2=CH$) on its surface. The said organic polymer cross-linker can be prepared with the existing technologies.

According to a preferred embodiment of the invention, the said organic polymer cross-linker can be prepared as follows:

Dissolve acrylamide monomer and initiator separately in deionized water to get the solution D1 and solution D2. Add lipophilic emulsifier and hydrophilic emulsifier into the oil-phase solvent and stir evenly to get the solution E. Add the solution D1 and solution D2 successively into the solution E drop by drop and stir them evenly. Let the mixture stand for reaction under the temperature of 50-70° C. for 4-8 h and then add the functional cross-linker to get the microemulsion F. Adjust the pH of the microemulsion F to 4-6 with the hydrochloric acid solution with a mass fraction of 10% to get the microemulsion I; then add the precipitant into the microemulsion I to separate out the solid-phase materials which then will be washed and dried to get the organic polymer cross-linker.

According to a preferred embodiment of the invention, the said solution D1 and microemulsion F have a mass ratio of 1:5-20, which is further preferred to be 1:7-15.

According to a preferred embodiment of the invention, the said solution D2 and microemulsion F have a mass ratio of 1:30-60, which is further preferred to be 1:40-45.

According to a preferred embodiment of the invention, by taking the total weight of the microemulsion F as the benchmark, the dosage of the said acrylamide monomer is 5-15 wt %; the dosage of the said initiator is 0.02-0.1 wt %; the dosage of the said lipophilic emulsifier is 4-10 wt %; the dosage of the said hydrophilic emulsifier is 10-20 wt %; the dosage of the said oil-phase solvent is 45-70 wt %; and the dosage of the said functional cross-linker is 1-3.5 wt %. According to the further preferred embodiment of the invention, by taking the total weight of the microemulsion F as a benchmark, the dosage of the said acrylamide monomer is 5-10 wt %; the dosage of the said initiator is 0.04-0.08 wt %; the dosage of the said lipophilic emulsifier is 5-8 wt %; the dosage of the said hydrophilic emulsifier is 12-16 wt %; the dosage of the said oil-phase solvent is 50-65 wt %; and the dosage of the said functional cross-linker is 1.5-3 wt %.

According to a preferred embodiment of the invention, the said initiator is potassium persulfate and/or ammonium persulfate.

According to a preferred embodiment of the invention, the said lipophilic emulsifier is a mixture of Span60 and Span80; and the mass ratio of Span60 and Span80 is 0.2-0.6:1 and is further preferred to be 0.3-0.5:1.

According to a preferred embodiment of the invention, the said hydrophilic emulsifier is a mixture of Tween60 and Tween80; and the mass ratio of Tween60 and Tween80 is 1-4:1 and is further preferred to be 1.5-2.5:1.

According to a preferred embodiment of the invention, the said oil-phase solvent is a combination of one or more from among cyclohexane, kerosene and liquid paraffin;

According to a preferred embodiment of the invention, the said functional cross-linker is N-methylol acrylamide.

According to a preferred embodiment of the invention, the said precipitant is absolute ethyl alcohol, and the said precipitant and the microemulsion I have a volume ratio of 0.5-1.0:1; the said washing is to be carried out with absolute ethyl alcohol.

According to a preferred embodiment of the invention, the said resin toughening agent is in solid state; according to a further preferred embodiment of the invention, the said solid resin toughening agent is a combination of one or more from among phenolic resin, epoxy resin, urea resin and amino resin.

According to a preferred embodiment of the invention, the said flow pattern regulator is a combination of one or more from among aluminum-magnesium silicate, magnesium lithium silicate, Na-montmorillonite, and Li-montmorillonite.

According to a preferred embodiment of the invention, the said cross-linking regulator is a combination of one or more from among the encapsulated potassium persulfate, encapsulated sodium persulfate, and encapsulated ammonium persulfate. That is to say, the potassium persulfate, sodium persulfate or ammonium persulfate is added into the outer capsule structure to have the release rate regulated through the adjustment of the degradation rate of the outer capsule structure, initiating polymerization to adapt to different formation temperatures.

According to the invention, the preparation method of the said high-temperature resistant, high-strength, and thixotropic gel plugging agent comprises steps as follows:

(a) Add the acrylamide monomer, organic polymer cross-linker, and reactive polymer successively into the water and stir until they dissolve completely to get the mixed solution G;

(b) Add the resin toughening agent into the mixed solution G and stir until it distributes evenly to get the mixed solution H;

(c) Add the flow pattern regulator into the mixed solution H and stir until it distributes evenly to get the mixed solution J;

(d) Add the cross-linking regulator into the mixed solution J and stir until it dissolves completely to get the mixed solution K;

(e) Keep the mixed solution K standing after sealing for solidification and gelatinization to get the high-temperature resistant, high-strength, and thixotropic gel plugging agent.

According to a preferred embodiment of the invention, the said stirring speed in Step (a) is 100-400 rpm and is further preferred to be 200-300 rpm; the said stirring speed in Step (b) is 100-400 rpm and is further preferred to be 200-300 rpm; the said stirring speed in Step (c) is 200-600 rpm and is further preferred to be 300-400 rpm; the said stirring speed in Step (d) is 100-400 rpm and is further preferred to be 200-300 rpm.

According to a preferred embodiment of the invention, the said solidification temperature in Step (e) is 40-180° C. and is further preferred to be 60-150° C.; the solidification and gelatinization time is 2-12 h and is further preferred to be 3-8 h.

According to the invention, the said high-temperature resistant, high-strength, and thixotropic gel plugging agent is applicable for the leakage plugging of drilling fluid.

The technical features and beneficial effects of the invention are as follows:

1. The high-temperature resistant, high-strength, and thixotropic gel plugging agent presented in the invention is added with organic polymer cross-linker and reactive polymer; among them, the organic polymer cross-linker is a polymerizable macromolecular polymer with vinyl groups ($CH_2=CH$) on its surface and can polymerize with the vinyl groups ($CH_2=CH$) on the acrylamide monomer to generate the first-type network skeleton under certain conditions; the said reactive polymer is a polycondensatable macromolecular polymer with hydroxymethyl groups ($—CH_2OH$) on its surfaces and can react with the polyacrylamide generated from the acrylamide by way of self-polymerization and the acylaminos ($—CONH_2$) on the organic polymer cross-linker for polycondensation, or serve as cross-linker to cross-link polymer molecules. Compared to conventional cross-linkers, the reactive polymer contains more cross bonds and has higher cross-linking density, which allows it to form a complex three-dimensional network structure with higher strength, i.e. the second-type network skeleton. Compared to conventional polymer gels, the existence of the first-type and second-type composite network structures can greatly improve the temperature resistance and gelatinization strength of the gel in the invention.

2. The high-temperature resistant, high-strength, and thixotropic gel plugging agent presented in the invention is added with resin toughening agent. It can have solidification and polymerization reactions at a certain temperature to form a hybrid third-type structure, namely the resin network skeleton, further improving the temperature resistance and gelatinization strength of the gel in the invention. This is beneficial to improving the high-pressure sealing ability of the gel plugging agent in large fracture leakage layers after solidification.

3. The high-temperature resistant, high-strength, and thixotropic gel plugging agent in the invention can provide the gel solution with shear thixotropy before solidification due to the addition of the flow pattern regulator. The gel solution shows a low apparent viscosity during the shear flow and is easy to be pumped into the wellbore and then into the formation leakage layer; after the pumping stops, the gel solution shows rapidly increased viscosity and strong adhesive force, so it can stay in the leakage layers easily, especially in the large vertical fracture; then, it gelates after cross-linking and solidifying and forms high-strength barriers in the leakage layers between the wellbore and the formation, preventing the drilling fluid from further leaking.

4. The high-temperature resistant, high-strength, and thixotropic gel plugging agent in the invention uses an encapsulated cross-linking regulator to regulate the release rate of the potassium persulfate, sodium persulfate or ammonium persulfate through the adjustment of the degradation rate of the outer capsule structures, thus adapting to different formation temperatures.

6. The preparation method of the high-temperature resistant, high-strength, and thixotropic gel plugging agent presented in the invention is simple and easy to operate and can be done on the drilling site.

DETAILED EMBODIMENTS

The invention is further described in combination with the embodiments as follows, but is not limited to that. All raw materials used in the embodiments are conventional raw materials available on the market; unless otherwise specified, the said methods can all be implemented with the existing technologies.

The organic polymer cross-linker and the reactive polymer used in the embodiments and the comparative examples are respectively prepared with the following methods as described in Preparation Example 1 and Preparation Example 2.

Preparation Example 1

A preparation method of the organic polymer cross-linker, including the following steps:

(1) Dissolve 6 g acrylamide monomer in 5 mL deoxygenated and deionized water to get the solution D1, and dissolve 0.06 g ammonium persulfate in 2 mL deoxygenated and deionized water to get the solution D2;

(2) Stir 6 g lipophilic emulsifier mixture of Span60/Span80 (the mass ratio of Span60 and Span80 is 0.4:1), 14 g hydrophilic emulsifier mixture of Tween60/Tween80 (the mass ratio of Tween60 and Tween80 is 2:1) and 63 mL cyclohexane evenly to get the solution E;

(3) Dropwise add the solution D1 and solution D2 successively and slowly into the solution E and stir evenly; place the above solution system still at 60° C. for 6 h and then add 2 g N-methylol acrylamide to get the microemulsion F; adjust the pH value of the microemulsion F to 5.5 with the hydrochloric acid solution with a mass fraction of 10% to get the microemulsion I;

(4) Add 70 mL absolute ethyl alcohol into the microemulsion I to separate out the solid-phase materials which then will be washed with absolute ethyl alcohol and dried to get the organic polymer cross-linker.

Figure 1:
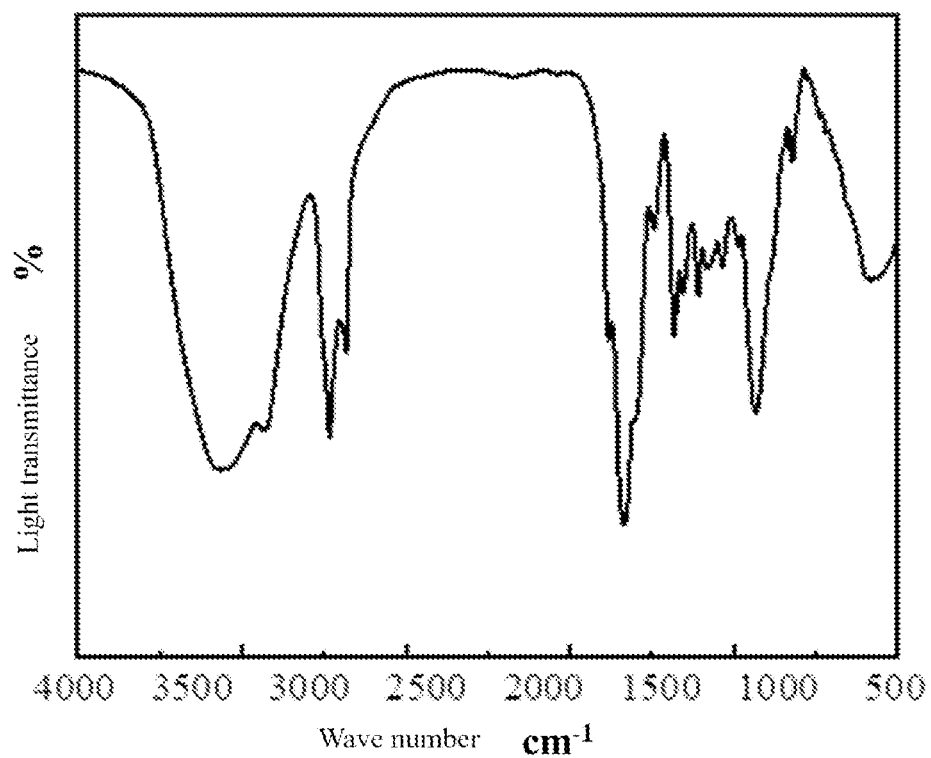
FIG. 1 is the infrared spectrogram of the organic polymer cross-linker prepared in Preparation Example 1.

Conduct an infrared spectrum test for the prepared organic polymer cross-linker with an infrared spectrometer. The infrared spectrogram is as shown in FIG. 1, from which it can be seen that the C=C double bond vibration peak appears at around 1605 $cm^{-1}$, which proves the existence of vinyl groups.

Preparation Example 2

A preparation method of the reactive polymer, including the following steps:

(1) Stir 0.12 g lipophilic emulsifier mixture of Span60/Span80 (the mass ratio of Span60 and Span80 is 0.4:1), 0.06 g hydrophilic emulsifier mixture of Tween60/Tween80 (the mass ratio of Tween60 and Tween80 is 2:1) and 7.1 g cyclohexane evenly; dropwise add 0.7 g α-methylstyrene slowly into the mixture system and stir evenly to get the solution A;

(2) Add 7 g acrylamide monomer and 0.8 g N-methylol acrylamide into 55 g deoxygenated and deionized water and stir until they dissolve completely; then, add 0.005 g EDTA and stir until it dissolves completely to get the solution B;

(3) Dropwise add the solution A slowly into the solution B with a dropping funnel and stir evenly; after the temperature rises to 50° C., add 0.35 g ethanediamine and 0.08 g ammonium persulfate successively and keep stirring to get the microemulsion C after reaction for 8 h.

(4) Add 50 mL absolute ethyl alcohol into the microemulsion C to separate out the solid-phase materials which then will be washed with absolute ethyl alcohol and dried to get the reactive polymer.

Figure 2:
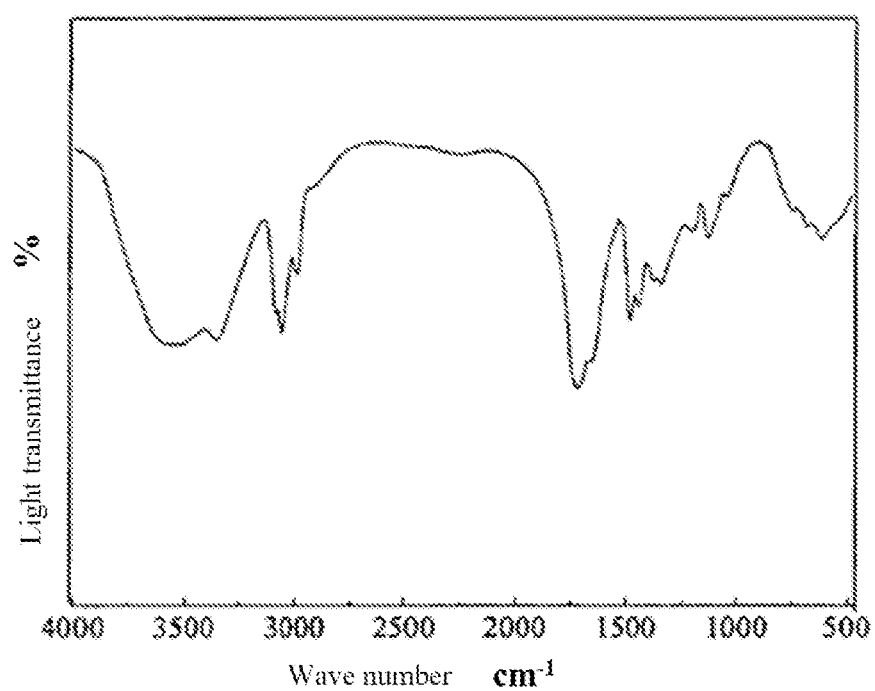
FIG. 2 is the infrared spectrogram of the reactive polymer prepared in Preparation Example 2.

Conduct an infrared spectrum test for the prepared reactive polymer with an infrared spectrometer. The infrared spectrogram is as shown in FIG. 2, from which it can be seen that the NH—H vibration peak and shear vibration peak of the amide appear at around the 3196 $cm^{-1}$ and 1610 $cm^{-1}$ respectively, which proves the existence of —$CONH_2$ groups in combination with the peaks appearing at around 1665 $cm^{-1}$ and 1416 $cm^{-1}$.

Embodiment 1

A high-temperature resistant, high-strength, and thixotropic gel plugging agent, which is composed of raw materials in the following mass percent: 18% acrylamide monomer, 0.8% organic polymer cross-linker, 0.3% reactive polymer, 7.0% urea resin, 4.0% lithium bentonite, 0.2% encapsulated ammonium persulfate, and water in the remaining percentage.

The said high-temperature resistant, high-strength, and thixotropic gel plugging agent is prepared in the following steps:

(a) Add the acrylamide monomer, organic polymer cross-linker, and reactive polymer successively into the water and stir at the speed of 250 rpm until they dissolve completely to get the mixed solution G;

(b) Add the resin toughening agent into the said mixed solution G and stir at the speed of 250 rpm until it disperses evenly to get the mixed solution H;

(c) Add the flow pattern regulator into the said mixed solution H and stir at the speed of 400 rpm until it disperses evenly to get the mixed solution J;

(d) Add the cross-linking regulator into the said mixed solution J and stir at the speed of 250 rpm until it dissolves completely to get the mixed solution K;

(e) Keep the mixed solution K standing after sealing and solidify it at 150° C. for 8 h to get the high-temperature resistant, high-strength, and thixotropic gel plugging agent $I_1$.

Embodiment 2

A high-temperature resistant, high-strength, and thixotropic gel plugging agent, which is composed of raw materials in the following mass percent: 15% acrylamide monomer, 0.55% organic polymer cross-linker, 0.2% reactive polymer, 5.5% urea resin, 3.0% lithium bentonite, 0.1% encapsulated ammonium persulfate, and water in the remaining percentage.

The said high-temperature resistant, high-strength, and thixotropic gel plugging agent is prepared according to the method in Embodiment 1, and the high-temperature resistant, high-strength, and thixotropic gel plugging agent $I_2$ is obtained.

Embodiment 3

A high-temperature resistant, high-strength, and thixotropic gel plugging agent, which is composed of raw materials in the following mass percent: 12% acrylamide monomer, 0.3% organic polymer cross-linker, 0.1% reactive polymer, 4.0% urea resin, 2.0% lithium bentonite, 0.05% of encapsulated ammonium persulfate, and water in the remaining percentage.

The said high-temperature resistant, high-strength, and thixotropic gel plugging agent is prepared according to the method in Embodiment 1, and the high-temperature resistant, high-strength, and thixotropic gel plugging agent $I_3$ is obtained.

Embodiment 4

A high-temperature resistant, high-strength, and thixotropic gel plugging agent, which is composed of raw materials in the following mass percent: 8% acrylamide monomer, 0.1% organic polymer cross-linker, 0.05% reactive polymer, 3.0% urea resin, 1.0% lithium bentonite, 0.01% encapsulated ammonium persulfate, and water in the remaining percentage.

The said high-temperature resistant, high-strength, and thixotropic gel plugging agent is prepared according to the method in Embodiment 1, and the high-temperature resistant, high-strength, and thixotropic gel plugging agent 14 is obtained.

Comparative Example 1

A gel plugging agent as described in Embodiment 1 provided however that the content of the acrylamide monomer is 5%.

The said gel plugging agent is prepared according to the method in Embodiment 1, and the gel plugging agent II$_1$ is obtained.

Comparative Example 2

A gel plugging agent as described in Embodiment 1 provided however that no organic polymer cross-linker is added.

The said gel plugging agent is prepared according to the method in Embodiment 1, and the gel plugging agent II$_2$ is obtained.

Comparative Example 3

A gel plugging agent as described in Embodiment 1 provided however that no reactive polymer is added.

The said gel plugging agent is prepared according to the method in Embodiment 1, and the gel plugging agent II$_3$ is obtained.

Comparative Example 4

A gel plugging agent as described in Embodiment 1 provided however that no urea resin is added.

The said gel plugging agent is prepared according to the method in Embodiment 1, and the gel plugging agent II$_4$ is obtained.

Comparative Example 5

A gel plugging agent as described in Embodiment 1 provided however that no lithium bentonite is added.

The said gel plugging agent is prepared according to the method in Embodiment 1, and the gel plugging agent II$_5$ is obtained.

Test Example

Test the gel plugging agents prepared in Embodiments 1-3 and Comparative Examples 1-5 for their thixotropy, mechanical performance, migration-filling effect, and plugging effect.

Testing method for the thixotropy of the gel plugging agent solution: Use a HAAKE RS6000 rotational rheometer to test the apparent viscosity of the gel plugging agent solution before solidifying at different shear rates (1.0-1000 l/s). The shear rate first increases from low to high and then decreases by the original values. In this test, compared to the initial apparent viscosity (at the shear rate of 1.0 l/s), when the shear rate is reduced again to 1.0 l/s after high-speed shearing (100-1000 l/s), the closer the gel solution's apparent viscosity to the initial value, the better the thixotropy turns out to be. The results are shown in Table 1.

Testing method for the mechanical performance of the gel plugging agent after solidifying: Use a universal electronic tensile testing machine to test the tension-resistance mechanical performance of the gel plugging agent after gelatinization. In this test, the greater the fracture stress of the gel is, the higher the tensile strength of the gel after solidifying turns out to be. To be specific, the tension rate of the universal electronic tensile testing machine shall be 1 mm/s. The results are as shown in Table 2.

Testing method for the migration-filling effect of the gel plugging agent solution in a vertical fracture: Use a 50 cm long, 30 cm high and 5 mm wide visible fracture as a model to test the migration-filling effect of the gel plugging agent solution in vertical fractures. The specific testing method is as follows: Add 1000 mL dyed gel plugging agent solution into an intermediate container, and use a large-displacement constant-flux pump to inject water into the intermediate container at the speed of 10 mL/min; inject the gel solution into the vertically placed visual fracture model with the help of a piston; divide the fracture space equally into the upper and the lower parts by height, and take the total injection volume reaching half of the fracture space volume as a benchmark to observe in time and measure the distribution of the gel solution in the vertical fracture space based on the dyed area. Taking the ratio of the gel injection amount in the upper and lower parts of the fracture as a reference, the closer the ratio is to 1, the more even the distribution of gel solution is in the vertical fracture and the better the filling effect is, so that its filling effect in fractures can be evaluated. The test results are as shown in Table 2.

Testing method for the plugging effect of the gel plugging agent: Test the plugging effect of the gel plugging agent in fractures with a high-temperature and high-pressure leakage plugging testing device. Use a 10 cm long and 3.0 mm wide steel fracture model to simulate a leakage layer. The specific testing method is as follows: pour 500 mL gel plugging agent solution (added with the cross-linking regulator) into the dehydration cylinder of the leakage plugging device; place a movable piston from its upper part and then seal the cylinder by tightening its cover; after the solution solidifies for 8 h, pressurize the cylinder by injecting drilling fluid into it with a large displacement constant-flux pump, and record in time the pressure at the inlet end of the fracture model. Take the maximum pressure when the drilling fluid leaks from the outlet end of the fracture model as the maximum plugging pressure of the gel, and the testing temperature is 150° C. The test results are as shown in Table 2.

TABLE 1

Thixotropy testing data of the gel plugging agent solution before solidifying

| | Shear rate (1/s) (first increase and then decrease) | | | | | | |
|---|---|---|---|---|---|---|---|
| No. | 1.0 | 10 | 100 | 1000 | 100 | 10 | 1.0 |
| I$_1$ | 3650 | 823 | 143 | 130 | 145 | 840 | 3600 |
| I$_2$ | 3400 | 785 | 139 | 125 | 142 | 795 | 3350 |
| I$_3$ | 3100 | 779 | 125 | 110 | 122 | 785 | 3020 |
| II$_1$ | 3550 | 796 | 142 | 127 | 141 | 801 | 3380 |
| II$_2$ | 3250 | 730 | 136 | 122 | 135 | 735 | 3090 |
| II$_3$ | 3290 | 716 | 139 | 124 | 140 | 712 | 3120 |
| II$_4$ | 3230 | 706 | 132 | 119 | 135 | 708 | 3070 |
| II$_5$ | 132 | 28 | 12 | 10 | 14 | 24 | 83 |

TABLE 2

Testing data of the mechanical performance, migration-filling effect, and fracture plugging effect of the gel plugging agents after solidifying

| No. | $I_1$ | $I_2$ | $I_3$ | $II_1$ | $II_2$ | $II_3$ | $II_4$ | $II_5$ |
|---|---|---|---|---|---|---|---|---|
| Maximum tensile fracture stress/KPa | 245 | 238 | 220 | 68 | 93 | 124 | 140 | 162 |
| Gel injection volume ratio of the upper and lower parts of the fracture | 0.98 | 0.95 | 0.94 | 0.97 | 0.96 | 0.96 | 0.94 | 0.45 |
| Maximum plugging pressure of fracture/MPa | 5.35 | 5.18 | 5.05 | 2.28 | 2.48 | 3.40 | 3.85 | 4.02 |

As can be seen from Table 1 and Table 2, when the gel plugging agents prepared in the embodiments of the invention are in solution state before solidifying and subject to a shear rate of 1.0 l/s, the gel solution has a high apparent viscosity; when the shear rate increases to 1000 l/s, the apparent viscosity decreases. Hereafter, as the shear rate gradually decreases, the apparent viscosity starts to pick up slowly; when the shear rate decreases to 1.0 l/s, the apparent viscosity basically returns to the value when the initial shear rate is 1.0 l/s. This indicates that the gel plugging agent prepared in the invention is destroyed in structure when sheared in solution state before solidifying and its viscosity is decreased, but it can re-establish the apparent viscosity when the shearing force disappears, which proves that the gel plugging agent is not affected by the shear process and has excellent thixotropic properties. The gel plugging agents prepared in the Comparative Examples 1~4 have no big differences before and after being sheared in solution state and have good thixotropic properties. By contrast, the gel plugging agent without flow pattern regulator in the Comparative Example 5 has a low apparent viscosity of 132 mPa·s before the gel solution solidifies and when the shear rate is 1.0 l/s; when the shear rate increases to 1000 l/s, the apparent viscosity of the gel solution is 10 mPa·s; when the shear rate decreases to 1.0 l/s, the apparent viscosity rises back to 83 mPa·s at last, proving that the gel plugging agent prepared in the Comparative Example 5 has poor thixotropic properties.

The maximum tensile fracture stress of the gel plugging agents prepared in Embodiments 1-3 in the invention are 245 KPa, 238 Kpa and 220 KPa respectively after solidifying, indicating that the gel plugging agents in the invention have excellent tension-resistance mechanical properties; the ratio of injection volume in the upper and lower parts of the fracture is 0.98, 0.95 and 0.94 respectively for the pre-solidification solution of the gel plugging agents prepared in Embodiments 1-3 in the invention, indicating that the gel plugging agents in the invention have excellent migration-filling effects and can fill up the vertical fractures evenly; also, the gel plugging agents prepared in the invention have higher maximum plugging pressure on the fracture after solidifying, indicating that they have excellent plugging effects; in Comparative Example 1, as the acrylamide monomer is in small amount, although the gel plugging agent has good migration-filling effect before solidifying, the tension-resistance mechanical performance and the plugging effect are poor; in Comparative Examples 2-4, although the solution of the prepared gel plugging agents have good migration-filling effect before solidification, but its tension-resistance mechanical performance and plugging effect are poor. In addition, as can be seen from Embodiment 1 and Comparative Example 2, the addition of the reactive polymer in the invention can greatly improve the tension-resistance mechanical performance and the plugging performance of the gel plugging agents. It can also be seen from Comparative Example 2 and Comparative Example 3 that reactive polymer can improve the tension-resistance mechanical performance and the plugging performance of the gel plugging agents better than the organic cross-linker polymer; although the gel plugging agent prepared in the Comparative Example 5 has better tensile strength and plugging capacity, its solution has poor migration-filling effect before solidification and cannot fill up the vertical fracture space evenly.

As can be seen from the above data, the gel plugging agents prepared in the embodiments of the invention have excellent thixotropic performance, mechanical performance, migration-filling capacity and plugging performance, showing that the gel plugging agents prepared in the invention have advantages of high temperature resistance, high strength, and thixotropy and can be used to solve the lost circulation problem in high-temperature deep fractured leakage formations.

The above content has described the preferred embodiments of the invention in detail, but the invention is not limited to that. Within the technical conceive of the present invention, a variety of simple variants can be made to the technical scheme of the present invention, including the combinations of various technical features in any other appropriate manner. These simple variants and combinations shall also be regarded as the disclosed content of the invention and shall fall within the protection scope of the invention.

What is claimed is:

1. A high-temperature resistant, high-strength, and thixotropic gel plugging agent, characterized in that it comprises raw materials in the following mass percent: 8-20% acrylamide monomer, 0.05-0.5% reactive polymer, 0.1-1.0% organic polymer cross-linker, 3.0-8.0% resin toughening agent, 1.0-5.0% flow pattern regulator, 0.01-0.5% cross-linking regulator, and water in the remaining percentage.

2. The high-temperature resistant, high-strength, and thixotropic gel plugging agent according to claim 1, characterized in that it comprises raw materials in the following mass percent: 12-18% acrylamide monomer, 0.1-0.3% reactive polymer, 0.3-0.8% organic polymer cross-linker, 4.0-7.0% resin toughening agent, 2.0-4.0% flow pattern regulator, 0.05-0.2% cross-linking regulator, and water in the remaining percentage.

3. The high-temperature resistant, high-strength, and thixotropic gel plugging agent according to claim 1, characterized in that the said reactive polymer is a polycondensatable macromolecular polymer with hydroxymethyl groups (—$CH_2OH$) on its surface.

4. The high-temperature resistant, high-strength, and thixotropic gel plugging agent according to claim 1, characterized in that the said reactive polymer has a viscosity-average molecular weight of 5-13 million.

5. The high-temperature resistant, high-strength, and thixotropic gel plugging agent according to claim 1, characterized in that the organic polymer cross-linker is a polymerizable macromolecular polymer with vinyl groups ($CH_2=CH$) on its surface.

6. The high-temperature resistant, high-strength, and thixotropic gel plugging agent according to claim 1, characterized in that the said resin toughening agent is a combination of one or more from among phenolic resin, epoxy resin, urea resin and amino resin.

7. The high-temperature resistant, high-strength, and thixotropic gel plugging agent according to claim 1, characterized in that the said flow pattern regulator is a combination of one or more from among aluminum-magnesium silicate, magnesium lithium silicate, Na-montmorillonite, and Li-montmorillonite.

8. The high-temperature resistant, high-strength, and thixotropic gel plugging agent according to claim 1, characterized in that the said cross-linking regulator is a combination of one or more from among encapsulated potassium persulfate, encapsulated sodium persulfate, and encapsulated ammonium persulfate.

9. The high-temperature resistant, high-strength, and thixotropic gel plugging agent according to claim 3, characterized in that the reactive polymer is prepared by the following steps:
   (1) add lipophilic emulsifier and hydrophilic emulsifier into oil phase solvent and stir them evenly; then, add hydrophobic monomer drop by drop into the above solution system and stir them evenly to get solution A;
   (2) add acrylamide monomer and functional cross-linker into deoxygenated and deionized water, and stir until they dissolve completely; then, add EDTA and stir until it dissolves completely to get solution B;
   (3) add the solution A slowly into the solution B drop by drop and stir evenly, add chain extender and initiator in order to stimulate the reaction and get microemulsion C when the temperature is increased to 40-60° C.; and
   (4) add precipitant into the microemulsion C to separate out solid phase materials; wash and dry the solid phase materials to get the reactive polymer.

10. The high-temperature resistant, high-strength, and thixotropic gel plugging agent according to claim 9, characterized in that the Step (1) includes one or more of the following conditions:
   i. said oil-phase solvent is a combination of one or more from among cyclohexane, kerosene, and liquid paraffin;
   ii. said lipophilic emulsifier is a mixture of sorbitan stearate and sorbitane monooleate, the mass ratio of sorbitan stearate to sorbitane monooleate in the said mixture is 0.2-0.6:1; the mass of the said lipophilic emulsifier is 0.5-2.5% of that of the oil-phase solvent;
   iii. said hydrophilic emulsifier is a mixture of polyethylene sorbitan monostearate and polyoxyethylenesorbitan monooleate, the mass ratio of polyethylene sorbitan monostearate to polyoxyethylenesorbitan monooleate in the mixture is 1-4:1; the mass of the said hydrophilic emulsifier is 0.25-1.2% of that of the oil-phase solvent; and
   iv. said hydrophobic monomer is a combination of one or more from among styrene, α-methylstyrene, and 4-methylstyrene; the mass of the hydrophobic monomer is 5-12% of that of the oil-phase solvent.

11. The high-temperature resistant, high-strength, and thixotropic gel plugging agent according to claim 9, characterized in that the Step (2) includes one or more of the following conditions:
   i. said acrylamide monomer and the deionized water have a mass ratio of 0.05-0.20:1;
   ii. said acrylamide monomer and the hydrophobic monomer have a mass ratio of 5-15:1;
   iii. said functional cross-linker is N-methylol acrylamide; the mass of the said functional cross-linker is 5-25% of that of the acrylamide monomer; and
   iv. mass of the EDTA is 0.03-0.2% of that of the acrylamide monomer.

12. The high-temperature resistant, high-strength, and thixotropic gel plugging agent according to claim 9, characterized in that the preparation method includes one or more of the following conditions:
   i. said chain extender in Step (3) is a combination of one or more from among ethanediamine, triethanolamine, trimethylolpropane, and sorbitol; the mass of the chain extender is 2-12% of that of the acrylamide monomer;
   ii. said initiator in Step (3) is potassium persulfate and/or ammonium persulfate, and the mass of said initiator is 0.2-2.5% of that of the acrylamide monomer;
   iii. said reaction time in Step (3) is 6-12 h;
   iv. said precipitant in Step (4) is absolute ethyl alcohol, said precipitant and the microemulsion C have a volume ratio of 0.5-1.0:1; and
   v. said washing in Step (4) is carried out with absolute ethyl alcohol.

* * * * *